United States Patent
Ansari et al.

(10) Patent No.: US 10,160,258 B2
(45) Date of Patent: Dec. 25, 2018

(54) DIGITALLY PRINTED HEAT TRANSFER LABEL AND METHOD OF MAKING A DECORATED ARTICLE

(75) Inventors: Saifuddin M. Ansari, West Chester, OH (US); Douglas L. Barnhardt, West Chester, OH (US); Bret Arnone, Mason, OH (US); Robert J. Wojewoda, Amelia, OH (US)

(73) Assignee: MCC-Norwood, LLC, Batavia, OH (US)

( * ) Notice: Subject to any disclaimer, the term of this patent is extended or adjusted under 35 U.S.C. 154(b) by 299 days.

(21) Appl. No.: 12/685,131

(22) Filed: Jan. 11, 2010

(65) Prior Publication Data

US 2010/0173136 A1 Jul. 8, 2010

Related U.S. Application Data

(63) Continuation-in-part of application No. PCT/US2009/061609, filed on Oct. 22, 2009.

(Continued)

(51) Int. Cl.
*B44C 1/17* (2006.01)
*C08L 33/02* (2006.01)
*C08L 23/04* (2006.01)

(52) U.S. Cl.
CPC ........... *B44C 1/1712* (2013.01); *C08L 33/02* (2013.01); *C08L 23/04* (2013.01);
(Continued)

(58) Field of Classification Search
CPC ....... B44C 1/1712; B44C 1/172; C08L 33/02; C08L 23/04; C08L 2666/04; B41M 5/035; B41M 5/392; B41M 5/395; B41M 5/44; B41M 5/42; B41M 5/41; B41M 5/00; B41M 3/12; D06P 5/003; D06P 3/32; G09F 3/10; G09F 3/02; G09F 3/00; B31D 1/02; B32B 3/00; B42D 15/00; B65C 5/04; B65C 9/25; B65C 9/46
(Continued)

(56) References Cited

U.S. PATENT DOCUMENTS 3,510,341 A 5/1970 Peck
3,516,842 A * 6/1970 Klinker, Jr. et al. ......... 428/40.5
(Continued)

FOREIGN PATENT DOCUMENTS

EP 0 879 711 A1 11/1998
KR 10-2001-0070263 A 7/2001
(Continued)

OTHER PUBLICATIONS

Annex to Form PCT/ISA/206 Communication Relating to the Results of the Partial International Search, dated Apr. 16, 2010—PCT/US2010/020590.
(Continued)

*Primary Examiner* — Laura C Powers
(74) *Attorney, Agent, or Firm* — Wood Herron & Evans LLP (57) ABSTRACT

A heat transfer label assembly comprises a carrier, a release layer overlying a first side of the carrier, and a primer overlying the release layer such that the release layer is disposed between the carrier and the primer. The primer may comprise at least one polyacrylic acid polymer.

20 Claims, 5 Drawing Sheets

Related U.S. Application Data (60) Provisional application No. 61/197,090, filed on Oct. 23, 2008, provisional application No. 61/144,504, filed on Jan. 14, 2009.

(52) U.S. Cl.
CPC .............. *Y10T 428/24802* (2015.01); *Y10T 428/24843* (2015.01); *Y10T 428/31786* (2015.04); *Y10T 428/31797* (2015.04)

(58) Field of Classification Search
USPC ............. 428/34.1, 330, 40.5, 328, 480, 483, 428/411.1, 200, 352, 354, 32.79, 212, 428/474.4, 500, 913, 914, 204; 524/517, 524/518, 601; 523/160; 525/221; 427/146; 156/230, 235, 240
See application file for complete search history.

(56) References Cited

U.S. PATENT DOCUMENTS

| | | | |
|---|---|---|---|
| 4,555,436 A | 11/1985 | Geurtsen et al. | |
| 4,762,748 A * | 8/1988 | Oberle | B32B 27/08 428/34.9 |
| 5,573,865 A | 11/1996 | Steelman | |
| 5,607,771 A | 3/1997 | Matsuse et al. | |
| 5,741,387 A * | 4/1998 | Coleman | 156/240 |
| 6,476,840 B1 * | 11/2002 | Taylor et al. | 347/212 |
| 6,562,451 B2 | 5/2003 | Syoda et al. | |
| 6,610,794 B1 | 8/2003 | Sakurai et al. | |
| 7,622,171 B2 * | 11/2009 | Laprade | 428/32.79 |
| 2003/0072901 A1 | 4/2003 | Dronzek, Jr. | |
| 2003/0098906 A1 * | 5/2003 | Randen et al. | 347/103 |
| 2003/0235664 A1 * | 12/2003 | Merical et al. | 428/35.7 |
| 2006/0172094 A1 | 8/2006 | Shi et al. | |
| 2007/0140600 A1 * | 6/2007 | Nowak | B32B 5/024 383/116 |
| 2008/0311331 A1 | 12/2008 | Laprade et al. | |

FOREIGN PATENT DOCUMENTS

| | | |
|---|---|---|
| WO | WO 95/06564 A1 | 3/1995 |
| WO | WO 2010/048368 A2 | 4/2010 |
| WO | WO 2010/083116 A2 | 7/2010 |

OTHER PUBLICATIONS

International Search Report, dated Aug. 19, 2010—PCT/US2010/020590.
Written Opinion, dated Aug. 19, 2010—PCT/US2010/020590.
Supplementary European Search Report for EP 10 73 1978 dated Jul. 27, 2012.
PCT/US2009/061609—International Search Report and Written Opinion, dated May 11, 2010, Graphic Packaging International, Inc.
PCT/US2010/020590—International Search Report and Written Opinion, dated Aug. 19, 2010, Graphic Packaging International, Inc.
PCT/US2009/061609—International Preliminary Report on Patentability, dated Apr. 26, 2011, Graphic Packaging International, Inc.
PCT/US2010/020590—International Preliminary Report on Patentability, dated Jul. 19, 2011, Graphic Packaging International, Inc.

* cited by examiner

DIGITALLY PRINTED HEAT TRANSFER LABEL AND METHOD OF MAKING A DECORATED ARTICLE

CROSS-REFERENCE TO RELATED APPLICATIONS

This application is a continuation-in-part of International Application No. PCT/US2009/061609, filed Oct. 22, 2009, which claims the benefit of U.S. Provisional Application No. 61/197,090, filed Oct. 23, 2008, and this application claims the benefit of U.S. Provisional Application No. 61/144,504, filed Jan. 14, 2009. Each of the above applications is incorporated by reference herein in its entirety.

TECHNICAL FIELD

This application is directed generally to heat transfer labels and, more particularly, digitally printed heat transfer labels and methods of making such labels. This application is also directed to various processes for manufacturing digitally printed labels and decorating containers with such labels.

BACKGROUND

Digital printing is used widely in the field of printing, particularly for the preparation of prototypes, low quantity print runs, and for the customization of print media. In contrast to many other printing techniques, digital printing does not require the preparation of costly printing plates and therefore allows for rapid transitioning between designs.

Despite its advantages, it is believed that digital printing has not been used to make heat transfer labels. Heat transfer labels are labels that are printed in reverse onto a release carrier and transferred to a container using heat and pressure. Instead, gravure or flexographic printing processes are typically used to make heat transfer labels, pressure sensitive labels, and other types of labels. Unfortunately, since it can take several weeks to prepare the printing cylinders or plates, the manufacturer must design the label well in advance of the actual decorating. As a result, the manufacturer is unable to make last minute changes to accommodate current promotions, product information changes, or to meet current demands in the marketplace. Additionally, the manufacturer may end up with an excess of decorated (i.e., labeled) containers in its inventory and/or may not have sufficient time to get new decorated containers into the marketplace.

The present inventors have discovered that there are unique challenges associated with the use of digital printing technology to print onto substrates with release layers. In particular, the heat associated with the digital printing process can cause premature softening of the release layer, which may result in defects in the print quality of the label and/or the decorated container. Thus, there remains a need for a heat transfer label and assembly suitable for use with digital printing. There also remains a need for a method of making a decorated container that allows greater flexibility in label design, reduces the time to market, and reduces the need for excess inventory.

SUMMARY

This disclosure is directed generally to a heat transfer label assembly that may be suitable for use with digital printing technology. The heat transfer label assembly includes a plurality of layers or components in a facing, contacting relationship with one another. In one example, the heat transfer label assembly includes a primer layer that comprises one or more materials that work in concert to assist with maintaining the stability of the heat transfer label assembly during the digital printing process.

This disclosure is also generally directed to various processes for making a label, for example, a heat transfer label, a pressure sensitive adhesive label, or any other kind of label. The various processes may use digital printing to simplify the design and manufacturing process.

Other features and aspects of the invention will be apparent from the following description and the accompanying figures.

BRIEF DESCRIPTION OF THE DRAWINGS

The description refers to the accompanying drawings in which like reference characters refer to like parts throughout the several views, and in which.

DESCRIPTION

Various aspects of the disclosure may be illustrated by referring to the figures, in which the relative widths of the various layers generally indicate the relative area of each layer in the structure. It will be understood that the relative thicknesses of the various layers may be altered or exaggerated for purposes of illustration, and that such thicknesses are not indicative of actual or relative thicknesses of actual structures. Further, although several different exemplary aspects, implementations, and embodiments are provided, numerous interrelationships between, combinations thereof, and modifications of the various inventions, aspects, implementations, and embodiments are contemplated hereby.

Figure 1A:
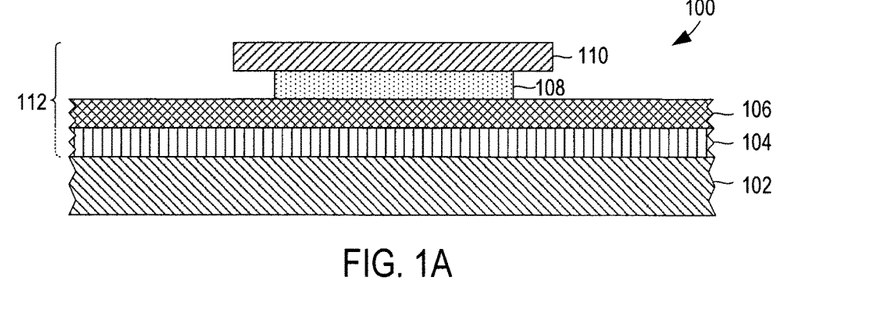
FIG. 1A is a schematic cross-sectional view of an exemplary heat transfer label assembly.
Figure 1B:
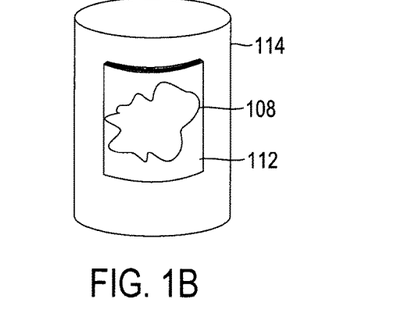
FIG. 1B is a schematic perspective view of a decorated container including, for example, the label of FIG. 1A.

FIG. 1A depicts a schematic cross-sectional view of an exemplary heat transfer label structure or assembly 100. The assembly 100 generally includes a plurality of layers including a carrier or substrate 102, a release coating or layer 104, a primer or primer layer 106, an ink 108, which may be digitally printed, and an adhesive (or adhesive coating or layer) 110. Each layer 102, 104, 106, 108, 110 is in a substantially facing, contacting relationship with the respective adjacent layer(s). Layers 106, 108, 110, and in some instances, at least a portion of layer 104, generally define a label 112. When the label 112 is joined to a container 114 (FIG. 1B), the adhesive 110 generally faces the exterior surface of the container 114.

While one specific structure or assembly 100 is illustrated schematically in FIG. 1A, it will be appreciated that each of the layers of the heat transfer label assembly 100 may vary for each packaging application. All layer names are provided for convenience of explanation and not limitation in any manner. Further, layers may be added or omitted as needed. By way of example, the adhesive 110 may be omitted in some embodiments where another means of securing the label 112 is provided. Other modifications are contemplated.

The heat transfer label assembly 100 may be used in the conventional manner using heat and pressure to transfer the ink 108, primer 106, and adhesive coating 110 of the label 112 to a container 114 in the conventional manner. Specifically, according to one exemplary method, the assembly 100 may be brought into intimate contact with the surface of the container 114 with the adhesive 110 facing the container 114. Heat and pressure may be applied to the assembly 100. The heat softens the release layer 104 and allows the primer 106, ink 108, and adhesive 110 to separate from the carrier 102, while the application of pressure transfers the primer 106, ink 108, and adhesive 110 to the container 114. Additionally, at least some of the release layer 104 may transfer to the container 114. Thus, the outermost layer of the transferred label 112 may comprise primer 108 and/or release layer 104. The decorated container may then be subject to a flaming process, during which any release layer 104 material transferred to the container is re-melted, thereby imparting a glossy finish to the label 112 on the container 114.

A plurality of labels 112 may be indexed along the length of the carrier 102 so that a multitude of containers 114 can be decorated using an automated process. It will be noted that the figures illustrate only one of such labels 112.

Various materials may be used to form each layer of the heat transfer label assembly 100, and each layer may have various basis weights or coat weights, depending on the particular application.

The substrate or carrier 102 generally comprises a base material on which the remaining layers of the assembly are supported. Accordingly, some layers may be described as "overlying" or being "on" other layers. However, it will be appreciated that the assembly 100 may be inverted, such that the carrier 102 overlies the other layers. Accordingly, such terminology is provided merely for convenience of explanation and not limitation in any manner.

The carrier 102 may generally comprise a flexible material, for example, paper. The paper may include a clay coating on one or both sides. The paper may have a basis weight of from about 5 to about 75 lbs/ream (i.e., lbs/3000 sq. ft.), for example, about 10 to about 50 lbs/ream, for example, from about 20 to about 30 lbs/ream. However, other ranges and basis weights are contemplated. In other instances, the carrier 102 may comprise other materials, for example, a polymer film. Other suitable carriers may be used.

The release layer 104 generally comprises a substance that softens in response to heat. In one particular example, the release layer comprises a wax or a blend of waxes. Generally, the release layer 104 is formed from a material having a sufficiently low softening point so the transfer of the label 112 (i.e., the separation of the carrier 102 from the label 112) can be initiated at a relatively low temperature ("release temperature" or "transfer temperature"), for example, from about 50° C. to about 85° C., for example, from about 55° C. to about 75° C., for example, from about 60° C. to about 70° C. In one particular example, the release layer 104 comprises a blend of waxes having a softening temperature of about 65° C. However, the softening temperature of the release layer may vary for each application. Accordingly, other suitable materials may be used.

As with the various other layers of the assembly 100, the release layer 104 may be present in any suitable amount needed to achieve the desired printing and/or transfer characteristics. In one example, the release layer 104 may have a basis weight of from about 2 to about 12 lbs/ream (on a dry basis), for example, from about 5 to about 9 lbs/ream. Other ranges and basis weights are contemplated. The release layer 104 may be deposited on or applied to the carrier 102 using any suitable technique, for example, using a Meyer rod or roll coater. Where the carrier 102 is a clay coated paper, the release layer 104 may be applied to the clay coated side of the paper if desired.

The primer 106 generally comprises a substance that prepares the surface of the release layer 104 for receiving ink 108, which may be applied using digital printing or any other suitable technique. The selection of the primer determines the visual quality of the printing, i.e., the ink receptivity, ink adhesion, and rub resistance of the ink.

Where the ink 108 is to be printed using digital printing, the present inventors have found that the temperatures associated with typical digital printing processes (e.g., the blanket temperature) may exceed the softening temperature of the release layer 104, which may cause the release layer 104 to soften and/or destabilize, thereby potentially causing various defects in the label 112. Such defects may include a reduction in print quality due to the overall destabilization of the printing surface (e.g., the primer 106 on the softened release layer 104), premature separation of the label 112 from the carrier 102, and/or "stringing" of the release layer 104 (and possibly primer 106), particularly along the peripheral edges or boundaries of the transferred label 112. Accordingly, the primer 108 may be selected to assist with stabilizing the release layer 104, for example, by having a chemical affinity for the release layer material 104 (e.g., wax), and/or by providing some degree of thermal insulation to reduce the amount of heat transferred from the blanket to the release layer 104.

It will be appreciated that numerous primers (i.e., primer compositions) may be suitable for stabilizing the release layer 104. In one example, the primer 108 may comprise a polyacrylic acid polymer, for example, a polyacrylic acid copolymer. In one particular example, the polyacrylic acid polymer may comprise an ethylene acrylic acid copolymer. The primer 108 also may include other polymeric components, for example, a polyethylene polymer, or any other suitable polymer. The primer 108 also may include one or more non-polymeric components, for example, silica, wax, and/or talc. Still other components may be included.

Thus, in one specific example, the primer 108 may comprise a blend of a polyacrylic acid polymer and optionally, one or more non-polymeric components, for example, silica, wax, and/or talc. In another specific example, the primer 108 may comprise a blend of a polyacrylic acid polymer, a polyethylene polymer, and optionally, one or more non-polymeric components, for example, silica, wax, and/or talc. In still another specific example, the primer 108 may comprise a blend of a polyacrylic acid polymer and a polyethylene polymer. However, numerous other primer compositions are contemplated.

Some examples of materials that may be suitable for use in the primer include DIGIPRIME 4500 primer (formerly referred to as "GPI X5 experimental primer") (Michelman, Inc., Cincinnati, Ohio) and DIGIPRIME 4501 (formerly referred to as "GPI X12 experimental primer") (Michelman, Inc., Cincinnati, Ohio), both of which are believed to comprise at least one polyacrylic acid polymer, for example, a polyacrylic acid copolymer, such as an ethylene acrylic acid copolymer. It is also believed that DIGIPRIME 4500 primer and/or DIGIPRIME 4501 primer may include one or more non-polymeric components, for example, silica, wax, and/or talc. Another material that may be suitable for use in the primer is ADCOTE 50C35 adhesive (Rohm & Hass, Philadelphia, Pa.), which is believed to comprise a polyethylene polymer. While not wishing to be bound by theory, it is believed that the ADCOTE 50C35 adhesive may assist with adhering the ink 108 to the release layer 104.

The amount of each component in the primer may vary for each application, depending on the particular digital printing application. By way example, in various exemplary primers including a polyacrylic acid polymer and a polyethylene polymer, the ratio of the polyacrylic acid polymer to the polyethylene polymer may be from about 1:1 to about 20:1, for example, from about 2:1 to about 15:1, for example, from about 3:1 to about 12:1, for example, from about 3:1 to about 7:1, for example, from about 4:1 to about 6:1. In some specific examples, the ratio may be about 4:1, about 4.5:1, about 5:1, about 5.5:1, about 6:1, about 6.5:1, about 7:1, about 7.5:1, about 8:1, about 8.5:1, about 9:1, about 9.5:1, about 10:1, about 10.5:1, about 11:1, about 11.5:1, about 12:1, or any other suitable ratio.

Likewise, for the specific example of an exemplary primer comprising a blend of DIGIPRIME 4501 primer and ADCOTE 50C35 adhesive, the ratio of DIGIPRIME 4501 primer solids (including the polyacrylic acid polymer) to ADCOTE 50C35 adhesive solids (including the polyethylene polymer) may be from about 1:1 to about 20:1, for example, from about 2:1 to about 15:1, for example, from about 3:1 to about 12:1, for example, from about 3:1 to about 7:1, for example, from about 4:1 to about 6:1. In some specific examples, the ratio of solids may be about 4:1, about 4.5:1, about 5:1, about 5.5:1, about 6:1, about 6.5:1, about 7:1, about 7.5:1, about 8:1, about 8.5:1, about 9:1, about 9.5:1, about 10:1, about 10.5:1, about 11:1, about 11.5:1, about 12:1, or any other suitable ratio.

As illustrated in the Examples, the present inventors have discovered that a primer including one or more polyacrylic acid polymers and, optionally, one or more non-polymeric components (e.g., example, silica, wax, and/or talc), provides the desired level of printing quality and temperature resistance for digital printing applications. The present inventors have also discovered that the addition of an additional polymeric component, for example, a polyethylene polymer, may enhance the quality of the label even further. However, it will be appreciated that numerous other suitable primers or primer compositions may be used.

The primer 106 may be present in the heat transfer label assembly in any suitable amount. For example, the primer may have a coat weight (dry) of from about 0.25 to about 2 lb/ream, for example, from about 0.5 to about 1 lb/ream. The primer 106 may be deposited on the release layer 104 using any suitable technique, for example, by flexographic or gravure printing. If needed or desired, the release layer 104 on the carrier 102 (e.g., a wax coated paper) may be subject to a corona treatment process to prepare the surface of the release layer 104 for receiving the primer. In one example, the corona treatment may be conducted at about 0.8 kW. However, other treatments are contemplated. After the primer 108 is applied, the partially constructed heat transfer label assembly may be dried.

The adhesive coating 110 generally comprises a material that is capable of adhering the ink to the container 114. Accordingly, the type of adhesive used may vary depending on the type of container being used. For example, when the container is polyethylene, one suitable adhesive may be a polyamide adhesive. Alternatively, when the container is glass, one suitable adhesive may be a polyester adhesive. Numerous other possibilities are contemplated. Additionally, as stated previously, in some embodiments the adhesive 110 may be omitted.

Likewise, the amount of adhesive may vary for each application. The adhesive may generally be applied in an amount of from about 0.5 to about 3 lbs/ream (dry), for example, from about 1 to about 1.5 lb/ream. As shown in FIG. 1A, the adhesive coating 110 may extend beyond the peripheral margin of the ink 108 to facilitate adhesion to the container 114. The adhesive may be applied to the ink using any suitable process, for example, by flexographic or gravure printing.

Figure 2:
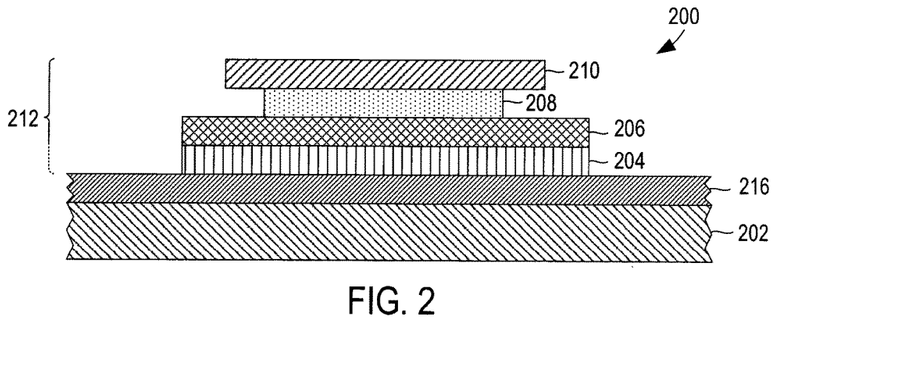
FIG. 2 is a schematic cross-sectional view of another exemplary heat transfer label assembly.

FIG. 2 schematically illustrates an exemplary variation of the heat transfer label structure 100 of FIG. 1. The heat transfer label assembly 200 of FIG. 2 includes features that are similar to the assembly 100 shown in FIG. 1, except for variations noted and variations that will be understood by those of skill in the art. For simplicity, the reference numerals of similar features are preceded in the figures with a "2" instead of a "1".

In this example, the carrier (e.g., paper) 202 may be coated with a curable hold-out coating 216, for example, an electron beam crosslinkable polymer. One such coated paper is commercially available from Coating Excellence, International (Wrightstown, Wis.) under the reference name "35# C1S/2# EB Coating".

A release layer 204 may overlie the hold-out coating 216. One example of a release layer that may be suitable is commercially available from Michelman, Inc. (Cincinnati, Ohio) under the trade name ML 162. However, numerous other release layers or coatings are contemplated. The ink 208 then may be applied digitally to the primer 206. The adhesive coating may 210 be omitted in some embodiments, as stated above.

The present disclosure may be understood further in view of the following examples, which are not intended to be limiting in any manner.

Example 1

A heat transfer label assembly was prepared using digital printing. The ink was printed directly onto the wax side of a wax-coated paper. The wax somewhat softened during the printing process, presumably because the softening point of the wax (about 57° C.) was slightly lower than the temperature of the ink applied. The premature softening of the wax rendered the label unsuitable for further use and evaluation.

Example 2

A heat transfer label assembly was prepared using digital printing and a commercially available primer. First, paper having a basis weight of about 30 lb/ream coated with about 6 lb/ream wax (coat weight varied from about 4-9 lb/ream) was coated on the wax side with about 1 lb/ream of DIGIPRIME 4450 primer (Michelman, Inc., Cincinnati, Ohio). The primer was dried at a temperature of about 38° C. at a line speed of about 50 ft/min. Next, an HP 4450 digital printer was used to apply a printed design over the primer.

The completed structure then was applied to a polyethylene terephthalate container in the conventional manner under heat and pressure (preheater temp about 90° C., platen temperature about 190° C.+/−25° C.). The results were acceptable and comparable to conventional heat transfer labels (e.g., printed using gravure printing or other conventional printing techniques). However, some "stringing" was observed as the wax-coated paper was separated from the label.

Example 3

A heat transfer label assembly was prepared using digital printing and a primer including a polyacrylic acid polymer. Specifically, DIGIPRIME 4500 primer (Michelman, Inc., Cincinnati, Ohio) (previously termed "GPI X5" by Michelman, Inc. as an experimental primer) was applied to a wax-coated paper (same as used in Example 2) in an amount of about 1 to 1.5 lb/ream (dry). As stated previously, it is believed that DIGIPRIME 4500 primer may include at least one polyacrylic acid polymer and possibly one or more non-polymeric additives, for example, silica, wax, and/or talc. It is also believed that DIGIPRIME 4500 primer has a lower tensile strength than the DIGIPRIME 4450 primer.

The completed structure then was applied to a polyethylene terephthalate container in the conventional manner under heat and pressure as described in Example 2. The label was successfully applied without stringing. Thus, digital printing was used to prepare a heat transfer label successfully. While not wishing to be bound by theory, it is believed that the primer reduced heat transfer from the digitally applied ink to the wax-coated paper and assisted with reducing the stringing of the label when the remainder of the structure was removed.

Example 4

Various primer compositions were used to prepare heat transfer label assemblies and evaluated as described in Example 3. The primer compositions included DIGIPRIME 4501 primer (about 21.5% solids, as provided) (Michelman, Inc., Cincinnati, Ohio) (previously termed "GPI X12" by Michelman, Inc. as an experimental primer) and, in some examples, ADCOTE 50C35 adhesive (about 34.0% solids, as provided) (Rohm & Hass, Philadelphia, Pa.). The results are set forth in Table 1, in which the solids ratio refers to the ratio of DIGIPRIME 4501 primer solids to ADCOTE 50C35 adhesive solids, and in which all values are approximate. It will be noted that although some blocking was observed with Sample 4, it is contemplated that this may be addressed using anti-blocking agents or otherwise.

TABLE 1

| Sample | Primer composition | Solids ratio | Results |
|---|---|---|---|
| 1 | 100% DIGIPRIME 4501 primer | 1:0 | Limited print length before print distorted |
| 2 | 92.2% DIGIPRIME 4501 primer 4.8% ADCOTE 50C35 adhesive 3.0% water | 12:1 | Results similar to Sample 1 with some improvement |
| 3 | 85.4% DIGIPRIME 4501 primer 9.0% ADCOTE 50C35 adhesive 5.6% water | 6:1 | Significantly better print quality than Samples 1 and 2 |
| 4 | 79.6% DIGIPRIME 4501 primer 12.6% ADCOTE 50C35 adhesive 7.8% water | 4:1 | Results similar to Sample 3, with some blocking of roll observed |

It will be evident that there are numerous advantages of using digital printing to prepare labels, including heat transfer labels. For example, digital printing obviates the need for costly and time-consuming gravure roll or flexographic plate preparation. Thus, a label manufacturer may be able to provide samples to customers within hours or days, rather than requiring several weeks of preparation time in addition to costly gravure roll or flexographic plate manufacture.

Digital printing may simplify the process of forming a decorated container in additional ways. By way of illustration, one example of a conventional process (e.g., supply chain) 300 for making and using a decorated article, for example, a container, is illustrated schematically in FIG. 3 (in which each block represents one or more steps of the process, as indicated). In this example, a label supplier is provided with information from a product manufacturer (e.g., a consumer or industrial products company) regarding a desired graphic content (i.e., the label design, layout, text, images, colors, etc.) for a label or label assembly. If needed, the graphic content is adjusted or revised by the label supplier to accommodate and/or address any limitations of the printing process (e.g., number of colors, bleed, etc.). The graphic content is then finalized by the label supplier and presented to the product manufacturer for approval.

Figure 3:
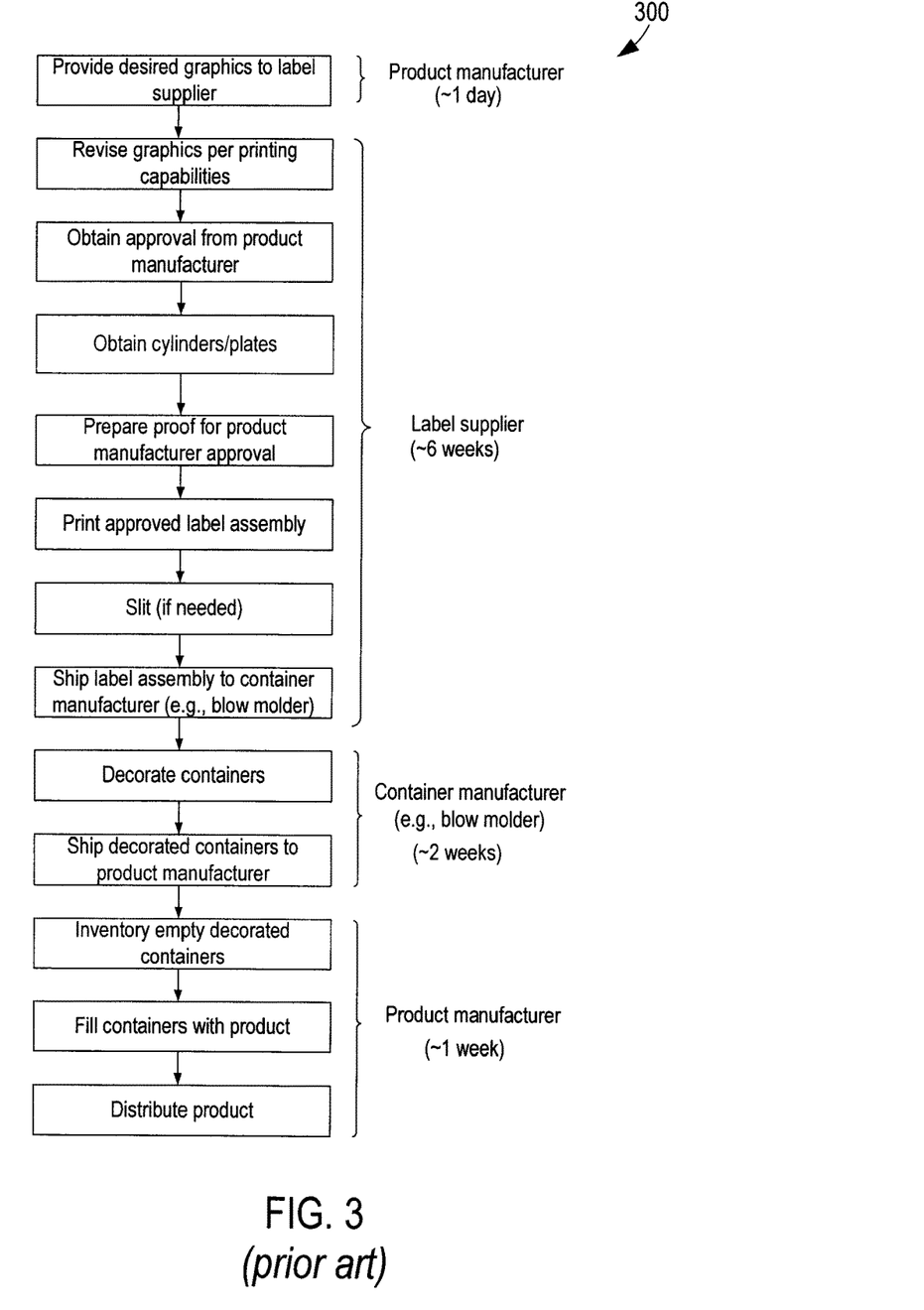
FIG. 3 schematically depicts a conventional operational chain for producing a decorated, filled container.

When the graphic content is approved, the printing cylinders or plates are prepared according to the specifications provided by the label supplier. In many instances, this involves contracting with an outside company that specializes in preparing printing cylinders or plates. Once the cylinders or plates are received, which can take up to about 4 weeks, the label supplier prepares a sample or proof of the printed label (or label assembly) to ensure that it complies with the manufacturer's specifications. If the proof is approved, the labels are printed, slit to the appropriate width as needed, and shipped to a container manufacturer, as specified by the product manufacturer. For purposes of simplicity, the container manufacturer is referred to hereinafter as the "blow molder". However, other types of containers and container manufacturers may be used in accordance with the disclosure.

The blow molder then decorates the containers by mounting the labels to the containers, which may be made inline (i.e., in the same process with the containers) or offline (i.e., separately from the containers and/or pre-made), and ships the decorated containers to the product manufacturer. Since there is such a long lead time to reach this point, product manufacturers often order an excess of decorated containers and maintain the containers in inventory to meet any unexpected demands. When needed, the decorated containers are filled and distributed to retail stores or elsewhere. The entire process may take up to about 9 weeks.

The present inventors have discovered that the use of digital printing may allow the decorated container to be formed and filled more efficiently, as illustrated schematically in the exemplary operational chains shown in FIGS. 4-7 (in which each block represents one or more steps of the process, as indicated). Any of the various processes described herein or contemplated hereby may be used in connection with heat transfer labels, pressure sensitive adhesive labels, or any other type of labels.

Figure 4:
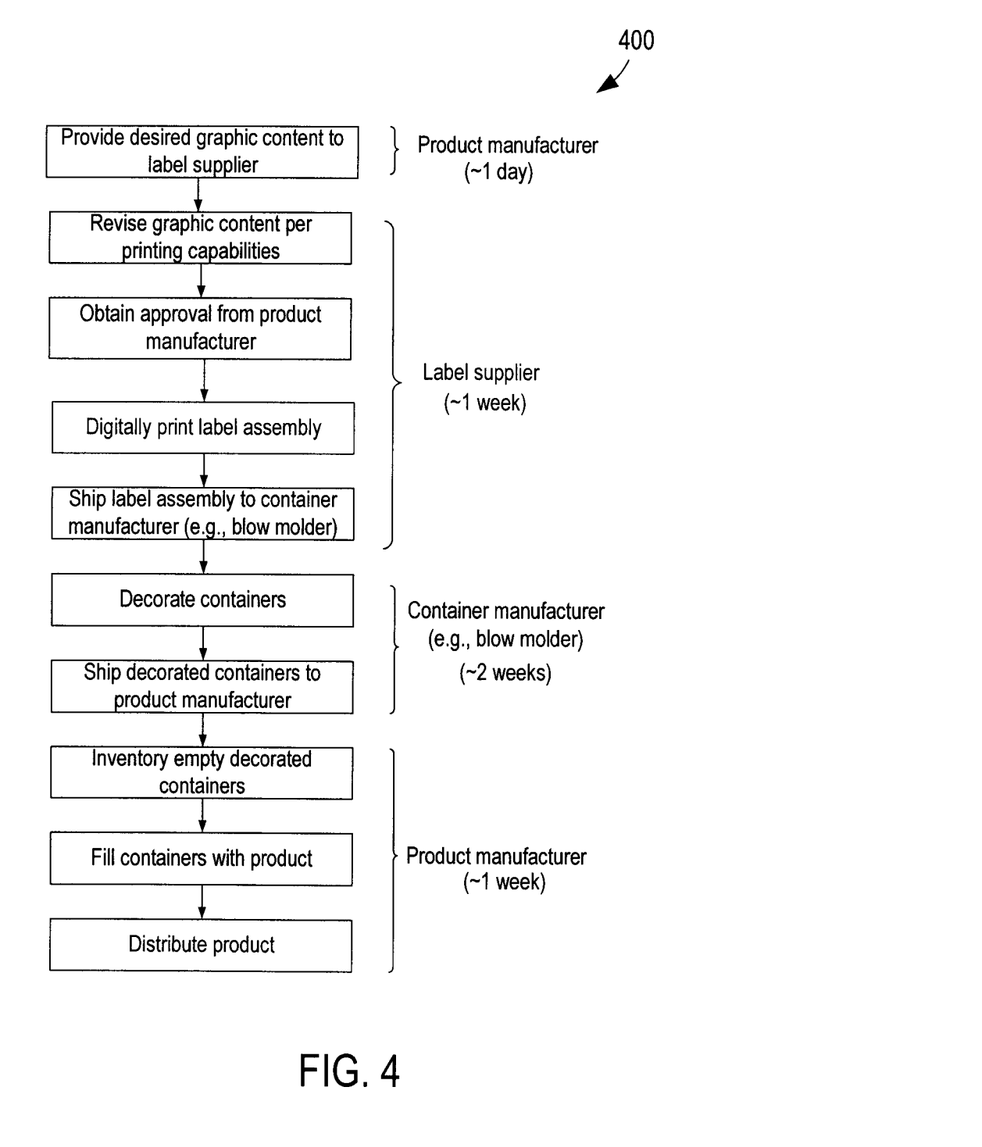
FIGS. 4-7 schematically depict various exemplary operational chains for producing a decorated, filled container using digital printing.

FIG. 4 schematically illustrates an exemplary process 400 that addresses at least some of the shortcomings of the conventional process shown in FIG. 3. In this process, digital printing is used to reduce the time between receiving the desired graphic content from the manufacturer and printing the labels. As shown in FIG. 4, a label supplier is provided with information from a product manufacturer regarding the desired graphic content of the label. If needed, the graphic content is revised by the label supplier to adjust for any limitations or requirements of the printing process (e.g., number of colors, bleed, etc.). However, since digital printing is typically more accurate than other conventional printing methods, fewer changes may need to be made using digital printing as compared with other printing methods. The digital artwork (i.e., the optionally revised graphic content) is then finalized by the label supplier and presented to the manufacturer for approval. The labels are printed by the label supplier and shipped to the blow molder.

The blow molder decorates the containers, which may be made inline or offline, and ships the decorated containers to the manufacturer. When needed, the decorated containers are filled and distributed to retail stores or elsewhere. The entire process may take up to about 4 weeks. Thus, by using digital printing, the time to market can be reduced by up to about 5 weeks, as compared with a traditional non-digital printing process.

Figure 5:
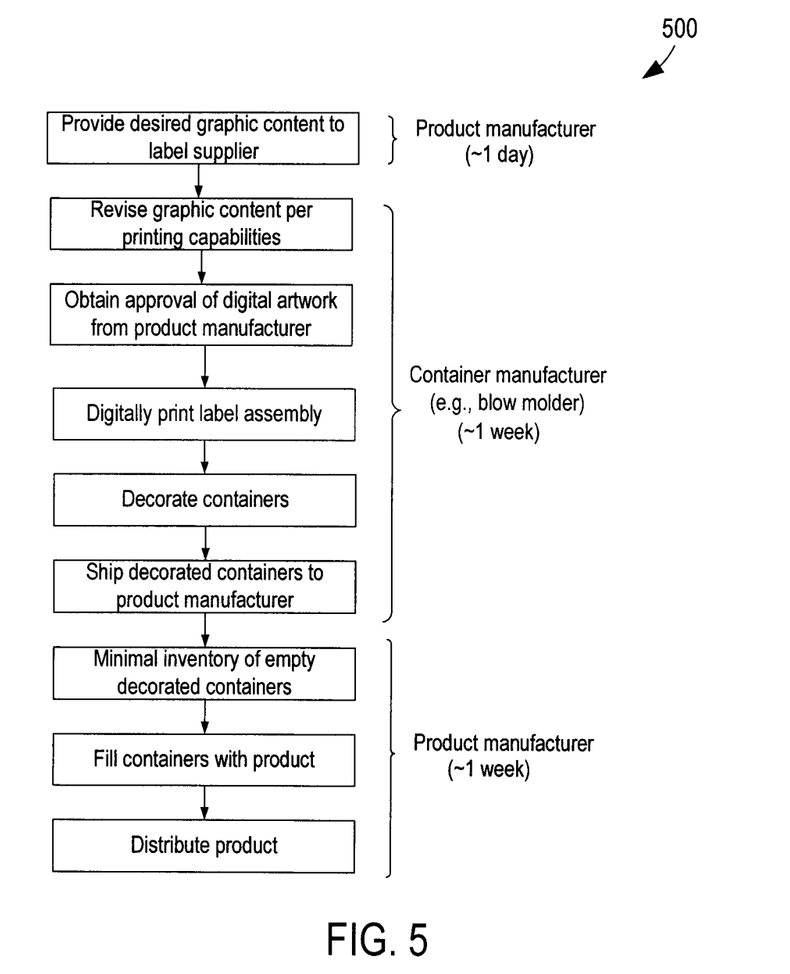
Figure 6:
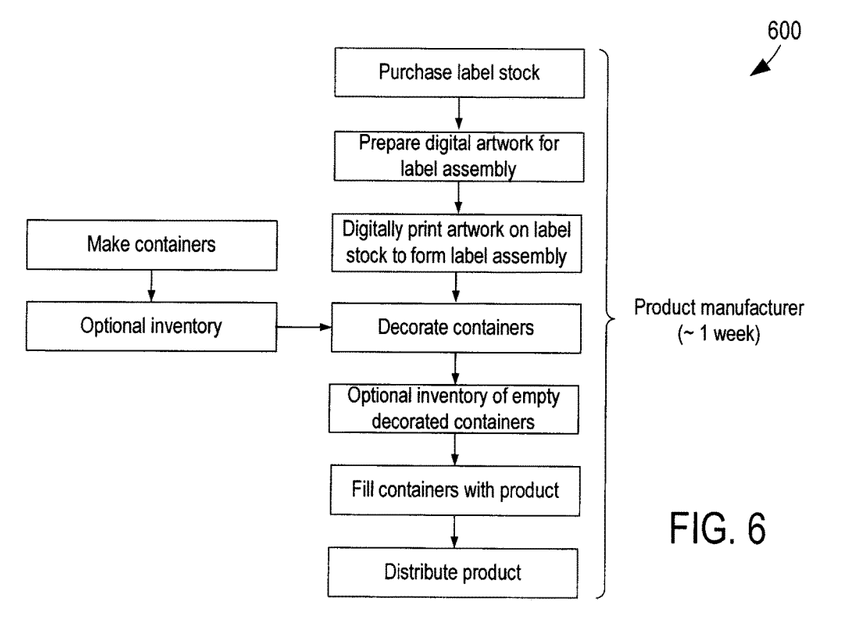

FIG. 5 schematically illustrates another exemplary process 500 that reduces time to market even further. In this process, the label supplier provides label stock to the blow molder, who receives the desired graphic content from the manufacturer, modifies the graphic content as needed, prepares the digital artwork for the manufacturer's approval, and digitally prints the labels. The blow molder then decorates the containers, which may be made inline or offline, and ships the decorated containers to the manufacturer to be filled and distributed. Since there is such a short lead time to obtain the decorated container, the manufacturer may significantly reduce its inventory of decorated containers if desired. This process generally may take about 1-2 weeks.

It will be noted that, in some instances, the manufacturer may make its own containers, for example, using a blow molding process or other suitable technique. In such instances, the manufacturer can achieve an even greater efficiency, since the containers and labels may be made on demand, and no time would be needed to transport the containers from a third party blow molder to the manufacturer. Thus, the time to market may be as little as one week or less. Such a process 600 is illustrated schematically in FIG. 6.

Figure 7:
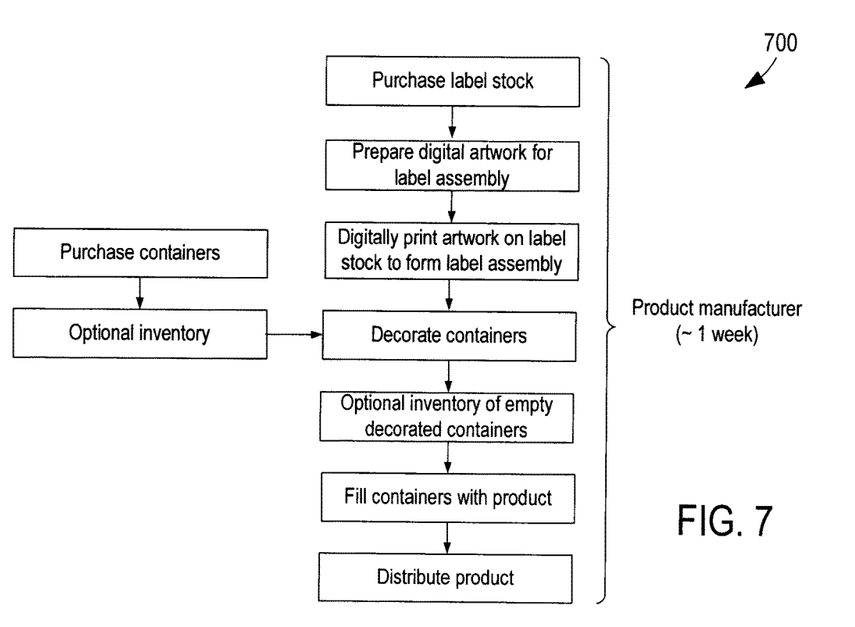

In still another exemplary process 700 illustrated schematically in FIG. 7, the manufacturer prints its own labels but obtains the containers from a separate blow molder. In this example, manufacturer can buy blank containers and print labels as needed, rather than having to have the blow molder do it. This would still allow for labeling on demand, but would require the manufacturer to maintain some number of containers in its inventory.

In each of the above scenarios, and in countless others contemplated hereby, digital printing greatly simplifies the preparation of a decorated article, for example, a container.

Although certain embodiments of this invention have been described with a certain degree of particularity, those skilled in the art could make numerous alterations without departing from the spirit or scope of this invention. Any directional references (e.g., upper, lower, upward, downward, left, right, leftward, rightward, top, bottom, above, below, vertical, horizontal, clockwise, and counterclockwise) are used only for identification purposes to aid the reader's understanding of various embodiments, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

It will be recognized by those skilled in the art that various elements discussed with reference to the various embodiments may be interchanged to create entirely new embodiments coming within the scope of the present invention. It is intended that all matter contained in the above description or shown in the accompanying drawings shall be interpreted as illustrative only and not limiting. Changes in detail or structure may be made without departing from the spirit of the invention. The detailed description set forth herein is not intended nor is to be construed to limit the present invention or otherwise to exclude any such other embodiments, adaptations, variations, modifications, and equivalent arrangements of the present invention.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

While the present invention is described herein in detail in relation to specific examples or aspects, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is not intended nor is to be construed to limit the present invention or otherwise to exclude any such other embodiments, adaptations, variations, modifications, and equivalent arrangements of the present invention.

What is claimed is:

1. A heat transfer label assembly comprising:
   a carrier;
   a release layer disposed on the carrier;
   a primer disposed on the release layer such that at least a portion of the release layer is positioned between the carrier and the primer, wherein the primer comprises a polyacrylic acid polymer and a polyethylene polymer; and
   ink disposed on the primer, such that at least a portion of the primer is positioned between the release layer and the ink, and wherein the ink is disposed on the primer at digital printing temperatures.

2. The heat transfer label assembly of claim 1, wherein the polyacrylic acid polymer comprises a polyacrylic acid copolymer.

3. The heat transfer label assembly of claim 2, wherein the polyacrylic acid copolymer comprises an ethylene acrylic acid copolymer.

4. The heat transfer label assembly of claim 1, wherein the primer further comprises at least one of silica, wax, and talc.

5. The heat transfer label assembly of claim 1, wherein the ratio of the polyacrylic acid polymer to the polyethylene polymer is from about 3:1 to about 7:1.

6. The heat transfer label assembly of claim 1, wherein the ratio of the polyacrylic acid polymer to the polyethylene polymer is from about 4:1 to about 6:1.

7. The heat transfer label assembly of claim 1, wherein the release layer comprises a material that softens upon sufficient exposure to heat.

8. The heat transfer label assembly of claim 1, wherein the release layer comprises a wax.

9. The heat transfer label assembly of claim 1, wherein the ink is digitally printed onto the primer.

10. The heat transfer label assembly of claim 1, wherein the label further includes an adhesive disposed on the ink, such that the ink is positioned between the primer and the adhesive.

11. A method of making the heat transfer label assembly of claim 1, comprising:
applying the primer to the release layer disposed on the carrier; and
digitally printing the ink onto the primer.

12. The method of claim 11, further comprising applying an adhesive to the digitally printed ink.

13. A method of decorating a container, comprising:
bringing the heat transfer label assembly of claim 1 into contact with a container, the heat transfer label assembly being positioned so that the carrier is distal from the container;
applying heat to the heat transfer label assembly in contact with the container so that the release layer softens; and
removing the carrier and, optionally, at least a portion of the release layer, so that the ink is deposited on the container.

14. The method of claim 13, wherein
the heat transfer label assembly further includes an adhesive disposed on the ink, and
bringing the heat transfer label assembly into contact with the container comprises contacting the adhesive of the heat transfer label with the container.

15. A container decorated according to the method of claim 13.

16. A method of making the heat transfer label assembly of claim 1 for decorating a container, the method comprising:
receiving a desired graphic content for a heat transfer label assembly from a requester;
making a sample of the heat transfer label assembly including the desired graphic content, wherein making the sample comprises digitally printing ink to provide the desired graphic content;
receiving approval from the requester to make the heat transfer label assembly; and
making the heat transfer label assembly.

17. The method of claim 16, wherein making the heat transfer label assembly comprises
applying the primer to the release layer disposed on the first side of the carrier; and
digitally printing the ink onto the primer.

18. The method of claim 17, wherein making the heat transfer label assembly further comprises applying adhesive onto the digitally printed ink.

19. A heat transfer label assembly comprising:
a wax coated paper;
a primer composition disposed on the wax coated paper, wherein the primer composition comprises a blend of a polyacrylic acid polymer and a polyethylene polymer and wherein the primer prevents destabilization of a print surface of the label due to softening of the release layer at digital printing temperatures; and
ink digitally printed onto the primer.

20. A heat transfer label assembly comprising:
a carrier comprising paper;
a release layer disposed on the paper;
a primer composition disposed on the release layer, wherein the primer composition comprises a blend of a polyacrylic acid polymer and a polyethylene polymer;
ink disposed directly on the primer at digital printing temperatures; and
adhesive disposed on the ink.

* * * * *